United States Patent [19]

Phillips

[11] Patent Number: 4,476,684

[45] Date of Patent: Oct. 16, 1984

[54] HOT BED POWER

[76] Inventor: John R. Phillips, 911 Maryhurst Dr., Claremont, Calif. 91711

[21] Appl. No.: 476,825

[22] Filed: Mar. 18, 1983

Related U.S. Application Data

[63] Continuation-in-part of Ser. No. 442,585, Nov. 18, 1982, abandoned.

[51] Int. Cl.³ ............................................. F01K 9/00
[52] U.S. Cl. ..................................... 60/689; 60/641.5; 60/649; 60/693; 165/7; 165/104.15
[58] Field of Search ................ 60/641.2, 641.5, 649, 60/659, 673, 685, 689, 693; 165/7, 110, 104.11, 104.15, 104.16

[56] References Cited

U.S. PATENT DOCUMENTS

| | | | |
|---|---|---|---|
| 3,951,794 | 4/1976 | Swearingen | 60/641.2 X |
| 4,380,903 | 4/1983 | Matthews | 60/693 |
| 4,424,857 | 1/1984 | Linde | 165/7 X |

Primary Examiner—Stephen F. Husar
Attorney, Agent, or Firm—Cristie, Parker & Hale

[57] ABSTRACT

A process for condensing exhaust vapor comprises alternating modes of operation. In the first mode, the exhaust vapor contacts solid particles at a first temperature below the condensation temperature of the vapor and, simultaneously, solid particles at a second temperature above the first temperature are cooled to the first temperature. In the second mode, the exhaust vapor contacts the solid particles that were cooled in the first mode and, simultaneously, solid particles that were heated in the first mode are cooled to the first temperature. This cycle repeats continuously.

20 Claims, 4 Drawing Figures

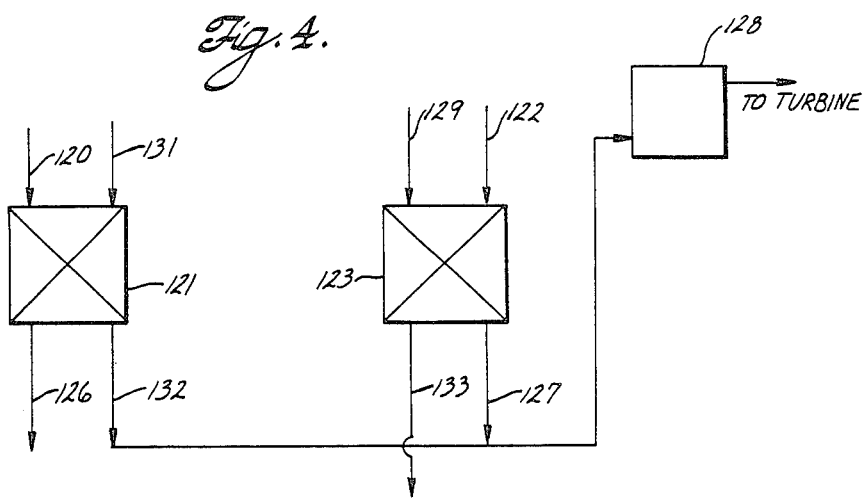

HOT BED POWER

CROSS REFERENCES TO RELATED APPLICATION

This application is a continuation-in-part application of Ser. No. 422,585, filed Nov. 18, 1982, now abandoned.

FIELD OF THE INVENTION

This invention relates to a process for improving the efficiency of heat engines and, more particularly, to a process for condensing exhaust vapor from heat engines.

BACKGROUND OF THE INVENTION

There is currently a growing interest in the utilization of low temperature energy sources, especially low temperature liquid heat sources, for power production. Processes for generating power from low temperature liquid heat sources, such as geothermal brine, solar ponds, ocean thermal energy conversions (OTEC), waste heat, etc., are known.

In one such process, generally referred to as a direct flash process, the low temperature liquid heat source is flashed, i.e., vaporized. The vapor thus produced is passed to a power turbine or the like.

In the turbine the vapor is accelerated by a pressure drop. The accelerated vapor is directed against the blades of the turbine which results in the production of mechanical rotary motion which can be employed to generate electrical power. The vapor is then discharged from the turbine at a reduced pressure.

A modification of the direct flash process is referred to as a binary process, wherein heat from the low temperature liquid heat source is first transferred to a secondary working fluid, typically an organic mixture having a lower boiling point than water. The working fluid is then flashed to produce vapor. The vapor is passed to the power turbine to produce power.

In either process, the initial pressure of the vapor entering the turbine is relatively low as a result of the relatively low temperature of the liquid heat source. In order for the process to produce sufficient power to be practical, the pressure drop through the turbine requires that the pressure of the exhaust be near or below atmospheric pressure. Reducing the pressure of the exhaust below atmospheric pressure requires a closed system, including condensers for condensing the vapor in the exhaust.

Among the difficulties associated with the production of power from low temperature heat sources, is the inherently low theoretical thermodynamic efficiency associated with low temperature heat sources which results in low power outputs. It is thus important that the efficiency of all steps of such a process for producing power from low temperature heat sources be maximized.

Present processes utilize conventional condensers having metallic tube and shell arrangements. Such condensers are not only expensive, but provide relatively inefficient heat transfer.

SUMMARY OF THE INVENTION

In accordance with the present invention, there is provided a process for removing heat from the exhaust of a heat engine. The process comprises one mode wherein the heat is removed from the exhaust of a heat engine by contact with solid particles at a temperature cooler than the exhaust temperature, while simultaneously cooling other solid particles, previously heated by contact with the exhaust, by contact with a cooling fluid, preferably air.

The process comprises at least one other mode following the first mode wherein the exhaust is contacted with solid particles previously cooled by contact with the cooling fluid, while simultaneously cooling solid particles which previously contacted the exhaust by contact with cooling fluid. The modes cycle continuously during the production of exhaust from the heat engine.

A preferred embodiment of the invention comprises a two-mode cyclic process. In the first mode, the heat engine exhaust, which comprises vapor at a temperature above its condensation temperature, is contacted with a first chamber containing solid particles initially at about a first temperature. The exhaust vapor is condensed and the temperature of the solid particles is increased to about a second temperature. The pressure of the first chamber is adjusted so that the condensation temperature of the exhaust vapor is above the second temperature.

Simultaneously with the vapor condensation in the first chamber, a second chamber containing solid particles is cooled from about the second temperature to about the first temperature by contact with fluid which is at a temperature below the first temperature.

After a first select period, sufficient for the temperature in the first chamber to reach about the second temperature and for the solid particles in the second chamber to be cooled to about the first temperature, the process is switched to the second mode.

In the second mode, the exhaust vapor is contacted with the solid particles in the second chamber which are initially at about the first temperature. Contact is sufficient for the vapor in the exhaust to condense and for the temperature of the solid particles to be increased to about the second temperature. The pressure in the second chamber is adjusted so that the condensation temperature of the exhaust is above the second temperature.

Simultaneously with the vapor condensation in the second chamber, the solid particles in the first chamber are cooled from about the second temperature to about the first temperature by contact with cooling fluid.

After a second select period, sufficient for the temperature of the solid particles in the second chamber to reach about the second temperature and for the solid particles in the first chamber to be cooled to about the first temperature, the process is again switched to the first mode wherein the exhaust vapor contacts the solid particles in the first chamber. The first mode then repeats. The process continually repeats this cycle, alternating between the first and second modes, thereby providing means for the continuous condensation of the exhaust vapor.

Another preferred embodiment of the invention comprises a three-mode cyclic process involving staged condensers which is particularly applicable to systems involving a heat engine which discharges heat in the form of both high pressure exhaust vapor and low pressure exhaust vapor.

In the first mode of the process, the low pressure exhaust vapor is contacted with a first chamber of solid particles initially at about a first temperature which is below the condensation temperature of the low pressure exhaust vapor. Contact is sufficient to condense the low pressure exhaust vapor and to raise the temperature of the solid particles to about a second temperature. The pressure in the first chamber is adjusted to about a first pressure wherein the condensation temperature of the low pressure exhaust vapor is above the second temperature. Simultaneously with the low temperature condensation in the first chamber, the high pressure exhaust vapor is contacted with solid particles in a second chamber which are initially at about the second temperature. Contact is sufficient to condense the high pressure exhaust vapor and to raise the temperature of the solid particles to about a third temperature. The pressure in the second chamber is adjusted to about a second pressure at which the condensation temperature of the high pressure exhaust vapor is above the third temperature.

At the same time, a third chamber of solid particles is cooled from about the third temperature to about the first temperature by contact with cooling fluid.

After a first interval, the process is switched to the second mode. In the second mode, the low pressure exhaust vapor is contacted with the solid particles in the third chamber which are at about the first temperature. The pressure in the third chamber is adjusted to about the first pressure. Contact is sufficient to condense the low pressure exhaust vapor and to raise the temperature of the solid particles to about the second temperature.

Simultaneously, the high pressure exhaust vapor is contacted with the solid particles in the first chamber which are at about the second temperature. The pressure in the first chamber is adjusted to about the second pressure. Contact is sufficient to condense the high pressure exhaust vapor and to raise the temperature of the solid particles in the first chamber to about the third temperature.

At the same time, the solid particles in the second chamber are cooled from about the third temperature to about the first temperature by contact with cooling fluid.

After a second interval, the process is switched to the third mode wherein the low pressure exhaust vapor is contacted with the solid particles in the second chamber which are now at about the first temperature. The pressure in the second chamber is adjusted to about the first pressure. Contact is again sufficient to condense the low pressure exhaust vapor and to raise the temperature of the solid particles in the second chamber to about the second temperature.

Simultaneously, the high pressure exhaust vapor is contacted with the solid particles in the third chamber which are now at about the second temperature. The pressure in the third chamber is adjusted to about the second pressure. Contact is sufficient to condense the high pressure exhaust vapor and to increase the temperature of the solid particles in the third chamber to about the third temperature.

Simultaneously, the temperature of the solid particles in the first chamber is reduced from about the third temperature to about the first temperature by contact with cooling fluid.

After this interval, the process is again switched to the first mode and the cycle continuously repeats.

BRIEF DESCRIPTION OF THE DRAWINGS

These and other features and advantages of the present invention will be better understood by reference to the following detailed description when considered in conjunction with the accompanying drawings wherein:

FIG. 4 is a schematic showing an alternative for binary cycle.

DETAILED DESCRIPTION

The present invention is particularly applicable to processes for producing power from low temperature liquid heat sources, i.e., liquid having a temperature generally below about 350° F., such as geothermal brine, solar ponds, OTEC, etc.

A preferred embodiment of the invention comprises a process for generating power from geothermal brine, or other liquid heat source, by a direct flash system. The process has two modes of operation.

Figure 1:
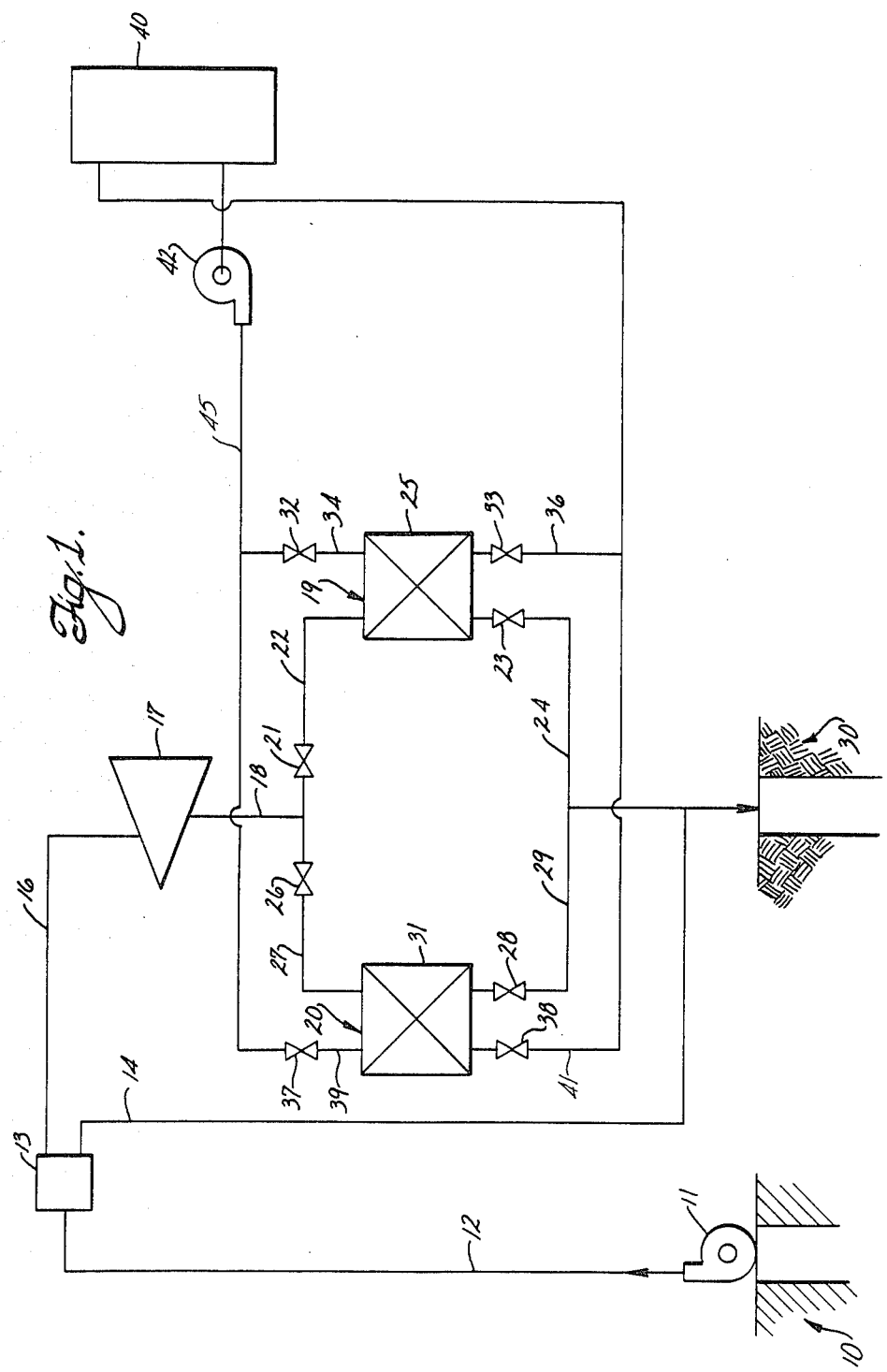
FIG. 1 is a schematic drawing of a preferred process according to the invention.

With reference to FIG. 1, geothermal brine from a hot brine well 10 passes through pump 11 and is delivered by line 12 to a flash evaporating chamber 13. In the flash evaporating chamber 13, a portion of the water in the brine is vaporized at a select pressure and forms steam. The remaining brine, more heavily concentrated in salt than the brine entering the process, is rejected through line 14 and is injected back into the ground through injection well 30 to replenish the reservoir.

The steam, at the select pressure, is passed by line 16 to a power turbine 17 wherein the steam undergoes a pressure drop to accelerate the steam. The accelerated steam is directed against the blades of the turbine, which results in the production of mechanical rotary motion. The mechanical rotary motion is used to generate electrical power.

The steam is discharged from the power turbine 17 at a reduced pressure as exhaust through exit line 18 and is directed to either a first condenser 19 or a second condenser 20, depending on which mode the process is in.

Each condenser comprises a contained bed or chamber of solid particles or pellets. Contained chambers suitable for this process are described in U.S. Pat. No. 4,218,290 to me which is incorporated herein by reference. The particles may be made of any suitable heat-transfer material of varying conductivity, such as alumina, iron, stainless steel, aluminum, silica, sand, gravel or the like. The particles generally have an average size in the range of from about ⅛ inch to about ½ inch.

Each chamber of solid particles has associated with it an exhaust steam inlet line, a condensed steam outlet line, a cooling fluid inlet line, and a cooling fluid outlet line. Each line comprises a valve for opening and closing the line.

At the beginning of the first mode, valve 21 in exhaust steam inlet line 22 and valve 23 in condensed steam outlet line 24, which are associated with first chamber 25, are open. Valves 32 and 33 in the inlet and outlet cooling fluid lines 34 and 36 to the first chamber 25 are closed. Valves 37 and 38 in the inlet and outlet cooling fluid lines 39 and 41 and valve 26 in the exhaust steam inlet line 27 to the second chamber 31 are also closed. Valve 28 in the condensed steam outlet line 29 to the second chamber 31 is open.

The exhaust steam flows from the steam turbine through exit line 18 and exhaust steam inlet line 22 into the first chamber 25, thereby contacting the solid particles contained in the first chamber 25.

The solid particles in the first chamber 25 are initially at about a first temperature which is below the condensation temperature of the exhaust steam. Contact between the exhaust steam and the solid particles transfers heat from the steam to the solid particles, resulting in condensation of the steam. The length of time that the exhaust steam contacts the particles of the first chamber is sufficient for the temperature of the particles to be increased to about a second temperature. The pressure in the first chamber is adjusted so that the condensation temperature of the steam is above the second temperature.

The second temperature is less than the condensation temperature of the exhaust steam to assure that condensation will take place within the duration of the first mode. A small temperature difference between the second temperature and the condensation temperature is preferred because the lower condensation temperature results in increased power production.

The first temperature, which is less than the second temperature, is selected as the optimum temperature which requires the least amount of energy to cool the solid particles to the first temperature by contact with a cooling fluid, and which provides the greatest increase in power output.

A lower first temperature results in a higher initial heat exchange rate, which increases the efficiency of the condenser. It also results in a larger temperature difference between the first and second temperatures which may enable the use of longer cycle times, thereby reducing the overall number of cycles required during the period of operation and, as a result, reducing the amount of power required for switching between modes.

However, the difference between the first temperature and second temperature is limited by the amount of energy that is required to cool the solid particles to about the first temperature. That is, the amount of power required to reduce the temperature of the solid particles to about the first temperature should not be greater than the increase in power resulting from the lower temperature. For example, if air is used as the cooling fluid, a first temperature which is above the ambient temperature of air is preferred. Such a temperature is preferred because it negates the need to cool the air prior to contacting the solid particles.

Condensed steam exits the first chamber through the condensed steam outlet line 24 and is injected back into the ground through injection well 30 along with the rejected brine. Alternatively, the condensed steam could be used as drinking water or the like.

Valve 28 in the condensed steam outlet line to the second chamber is open to drain condensed steam present in the second chamber at the beginning of the first mode. After the condensed steam has been drained, valve 28 is closed and valves 37 and 38 in the inlet and outlet cooling fluid lines 39 and 41 to the second chamber are open. Cooling fluid is pumped by pump 42 into the second chamber 31 and circulates through the particles and exits the second chamber through outlet line 41.

The cooling fluid can be any fluid which has a temperature below the first temperature. It is preferred that the cooling fluid be selected from the group consisting of air and water as both of those fluids are readily available, inexpensive and do not contaminate the condensed steam in the event that it is to be used as drinking water or the like. Other fluids, such as ammonia, light hydrocarbons and refrigerants, can be used if desired.

Air is particularly preferred because of availability and cost. In addition, the capital costs for the system are lower when air is used because the system is simple, e.g., no cooling water circulating lines are needed. Further, if the first temperature is above the ambient temperature of air, no cooling of the cooling fluid prior to contact with the solid particles is needed. If water is used as the cooling fluid rather than air, the cooling fluid is passed by line 41 to a cooling tower 40 wherein the temperature of the cooling fluid is reduced to its initial temperature below the first temperature. The cooling fluid is then recycled by line 45 to either the first or second chamber.

At the beginning of the first mode, the particles in the second chamber 31 are generally at about the second temperature. The temperature of the cooling fluid is sufficiently below the first temperature for contact between the particles in the second chamber and the cooling fluid, which transfers heat from the solid particles to the cooling fluid, to reduce the temperature of the solid particles to about the first temperature. After a select period, sufficient for the solid particles to be cooled to about the first temperature, the cooling water is drained from the second chamber.

After a first interval which is selected to be sufficient for the temperature of the particles in the first chamber to reach about the second temperature and, if water is used as the cooling fluid, for the cooling fluid to be drained from the second chamber, the process is switched from the first mode to the second mode.

At the beginning of the second mode, valves 37 and 38 in the inlet and outlet cooling fluid lines to the second chamber 31 are closed and valves 26 and 28 in the exhaust steam inlet line 27 and condensed steam outlet 29 to the second chamber 31 are open. All valves in the inlet and outlet lines of the first chamber 25 are closed except for valve 23 in condensed steam outlet line 24.

In this arrangement, the exhaust steam from the turbine is delivered to the second chamber 31, thereby contacting the solid particles that were cooled during the first mode of the process while condensed steam is drained from the first chamber 25.

In the second mode, the exhaust steam contacts the particles in the second chamber, resulting in condensation of the steam and an increase in the temperature of the solid particles to about the second temperature. The pressure in the second chamber is adjusted so that the condensation temperature of the exhaust steam is above the second temperature. The condensed steam exits the second chamber through condensed steam outlet line 29.

After the condensed steam present in the first chamber at the beginning of the second mode has drained, cooling fluid is introduced by pump 42 into the first chamber through inlet line 34. The cooling fluid, initially at a temperature below the first temperature, circulates through the solid particles and cools the particles to about the first temperature. The cooling fluid, if water, exits the first chamber 25 through outlet line 36 and is passed to cooling tower 40.

After a second interval, which is sufficient for the temperature in the second chamber to reach the second temperature and, if water is used as the cooling fluid rather than air, for the cooling fluid to be drained from the first chamber, the process is again switched to the first mode. Generally, the duration of the first and second intervals are the same. The cycle of alternating first and second modes continually repeats during the operation of the process, thereby providing continuous condensation of the exhaust steam.

By continuously switching from one pre-cooled chamber of solid particles to another, a small difference between the condensation temperature of the exhaust steam and the solid particles is maintained more easily than the corresponding temperature difference in conventional condensers comprising metallic shell and tube arrangements.

Further, with the development of microprocessors, such a switching process can be controlled easily and inexpensively. Conventional valves are suitable.

Another preferred embodiment of the invention comprises a three-mode cyclic process. This process is particularly applicable to a system involving a power turbine which produces both high pressure and low pressure exhaust although it may also be used with systems involving a power turbine which produces only a single exhaust wherein the single exhaust is split into two exhaust streams.

Figure 2:
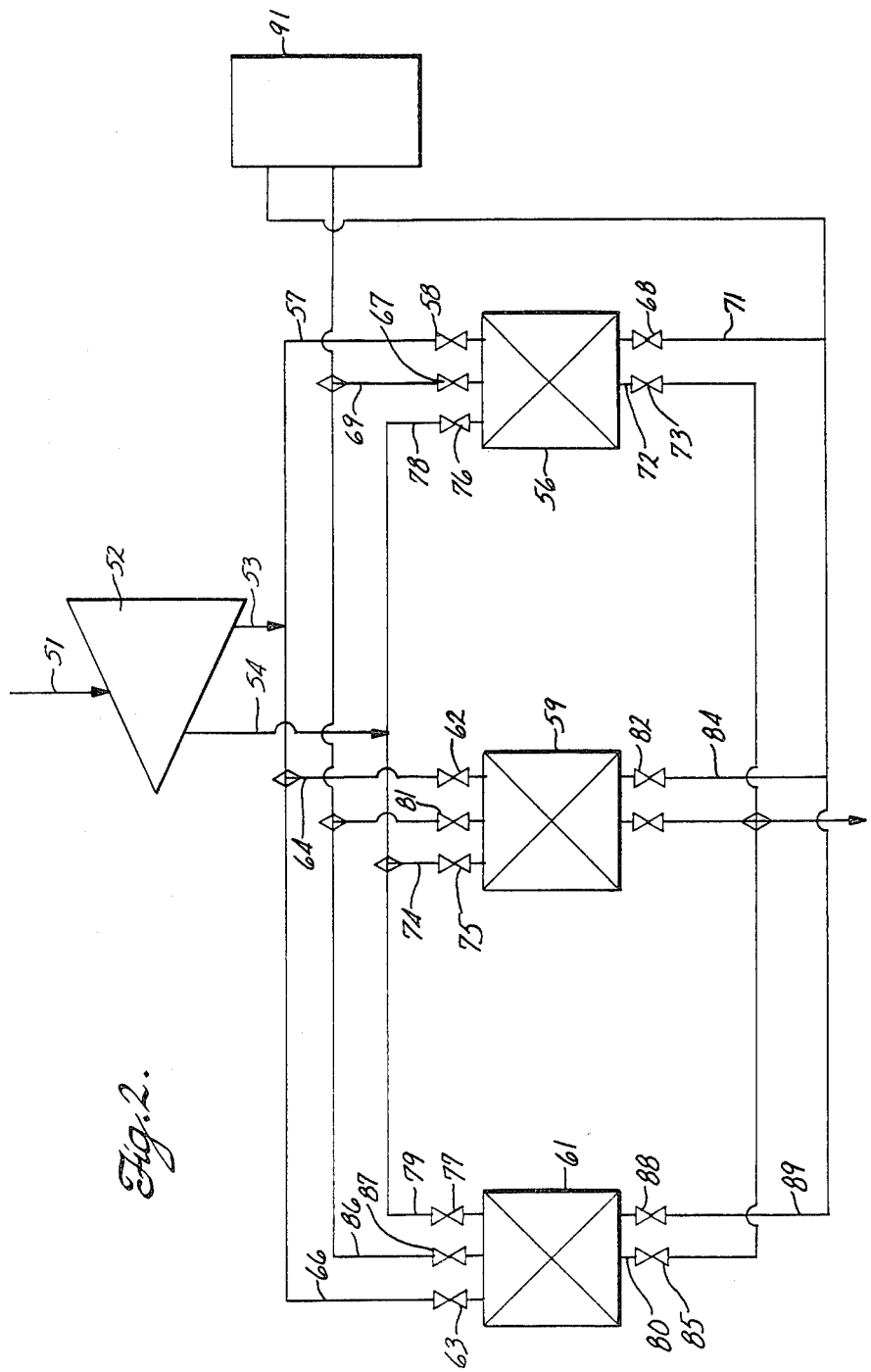
FIG. 2 is a schematic drawing of a second preferred process according to the invention.

The initial steps for delivering steam (or vapor from a secondary working fluid in the case of a binary system) to the power turbine are the same as previously described. With reference to FIG. 2, steam is delivered at a select pressure to the power turbine 51 through line 52. The power turbine 51 rejects heat in the form of low pressure exhaust through exit line 53 and high pressure exhaust through exit line 54.

In the process, there are three condensers, each comprising a chamber containing solid particles substantially the same as previously described. Each chamber has associated with it a high pressure exhaust steam inlet line, a low pressure exhaust steam inlet line, a condensed steam outlet line, and inlet and outlet cooling fluid lines. Each line has a valve for opening and closing the line.

In the first mode, the low pressure exhaust steam is directed from the power turbine 51 to the first chamber 56 through exit line 53 and low pressure exhaust inlet line 57, valve 58 being open. The low pressure exhaust steam is prohibited from entering either the second chamber 59 or the third chamber 61 by the closure of valves 62 and 63 in the low pressure inlet lines 64 and 66, respectively. Valves 67 and 68 in the inlet and outlet cooling fluid lines 69 and 71 to the first chamber 56 are closed.

The low pressure exhaust steam contacts the solid particles in the first chamber 56, which are initially at about a first temperature which is lower than the condensation temperature of the low pressure exhaust steam. Heat exchange takes place between the low pressure exhaust steam and the solid particles, resulting in condensation of the steam and an increase in the temperature of the solid particles to about a second temperature. The pressure in the first chamber is adjusted so that condensation temperature of the low pressure exhaust steam is above the second temperature. Condensed steam exits the first chamber through condensed steam outlet line 72, valve 73 being open, and is injected into the ground to replenish the reservoir.

The high pressure exhaust steam is directed from the power turbine to the second chamber 59 through exit line 54 and high pressure exhaust inlet line 74, valve 75 being open. In the first mode, valves 76 and 77 in high pressure exhaust inlet lines 78 and 79 to the first and third chambers are closed. Valves 81 and 82 in the inlet and outlet cooling fluid lines 83 and 84 to the second chamber are also closed.

The high pressure exhaust steam contacts the solid particles in the second chamber 59, which are initially at about the second temperature, which is lower than the condensation temperature of the high pressure exhaust steam. Heat exchange takes place between the high pressure exhaust steam and the solid particles, condensing the high pressure exhaust steam and raising the temperature of the solid particles to about a third temperature. The pressure in the second chamber is adjusted so that the condensation temperature of the high pressure exhaust steam is above the third temperature.

The third chamber 61 initially contains solid particles and condensed steam at about the third temperature. The condensed steam is drained through condensed steam outlet line 80, valve 85 being open. Valve 85 is then closed and cooling fluid, preferably air, is delivered to the third chamber through cooling fluid inlet line 86, valve 87 being opened. Valve 88 in the cooling fluid outlet line 89 is opened for passage of the cooling fluid from the third chamber. All other inlet and outlet lines to the third chamber are closed.

The cooling fluid contacts the solid particles and reduces the temperature of the solid particles. The cooling fluid is at an initial temperature sufficiently below the first temperature that contact with the solid particles reduces the temperature of the solid particles to about the first temperature within the duration of the first mode.

If water or any other liquid is used as a cooling fluid, valve 87 is closed prior to the end of the first mode and the cooling fluid is drained from the third chamber. The cooling fluid exiting the third chamber is then passed through cooling tower 91 to reduce the temperature of the cooling fluid to its initial temperature.

After a predetermined interval which is sufficient for the solid particles in the first chamber to reach about the second temperature, for the temperature of the solid particles in the second chamber to reach about the third temperature and the temperature of the solid particles in the third chamber to be reduced to about the first temperature, the process is switched to the second mode.

In the second mode, the valves in the inlet and outlet lines associated with each chamber are switched so that the low pressure exhaust steam is directed to the third chamber 61, the high pressure exhaust steam is directed to the first chamber 56, and condensed steam is drained from the second chamber followed by the introduction of cooling fluid to the second chamber 59.

In the third chamber 61, the low pressure exhaust steam contacts the solid particles which are now at about the first temperature. Low pressure exhaust steam is condensed and the temperature of the solid particles is increased to about the second temperature. The pressure in the third chamber is adjusted so that the condensation temperature of the low pressure exhaust steam is above the second temperature. Condensed steam exits the third chamber.

In the first chamber 56, the high pressure exhaust steam contacts the solid particles which are now at about the second temperature. High pressure exhaust steam is condensed and the temperature of the solid particles is increased to about the third temperature. The pressure in the first chamber is adjusted so that the condensation temperature of the high pressure exhaust steam is above the third temperature. Condensed steam exits the first chamber.

At the beginning of the second mode, condensed steam is drained from the second chamber. Cooling fluid is then introduced to the second chamber. The cooling fluid, which is at a temperature below the first temperature, circulates through the solid particles and reduces the temperature of the solid particles to about the first temperature. If water is used as the cooling fluid, the cooling fluid in the second chamber is drained prior to the end of the second mode and the cooling fluid passed to cooling tower 91.

After a second interval, generally the same as the duration of the first interval, the process is switched to the third mode. In the third mode, the valves in the inlet and outlet lines associated with each chamber are switched so that the low pressure exhaust steam is directed to the second chamber, the high pressure exhaust steam is directed to the third chamber, and condensed steam is drained from the first chamber followed by the introduction of cooling fluid to the first chamber.

In the second chamber, low pressure exhaust steam contacts solid particles which are initially at about the first temperature. The low pressure exhaust steam is condensed and the temperature of the solid particles is increased to about the second temperature. Pressure in the second chamber is adjusted so that the condensation temperature of the low pressure exhaust steam is above the second temperature.

In the third chamber, high pressure exhaust steam contacts the solid particles which are initially at about the second temperature. The high pressure exhaust steam is condensed and the temperature of the solid particles is increased to about the third temperature. The pressure in the third chamber is adjusted so that the condensation temperature of the high pressure exhaust steam is above the third temperature. Condensed steam exits the third chamber.

In the first chamber, condensed steam is drained. Cooling fluid is then introduced and contacts the solid particles and cools the solid particles to about the first temperature. Again, if water is used as the cooling fluid, it is drained from the first chamber and passed to cooling tower 91.

After the elapse of another interval, generally corresponding to the duration of the first or second interval, the process is switched again to the first mode. The modes of the process continually repeat in sequence, while the process for the production of power is operating.

The preceding description has been presented with reference to two presently preferred embodiments of the invention shown in the accompanying drawings. It is apparent, however, that alterations and changes in these described processes can be practiced without departing from the principles of this invention.

Figure 3:
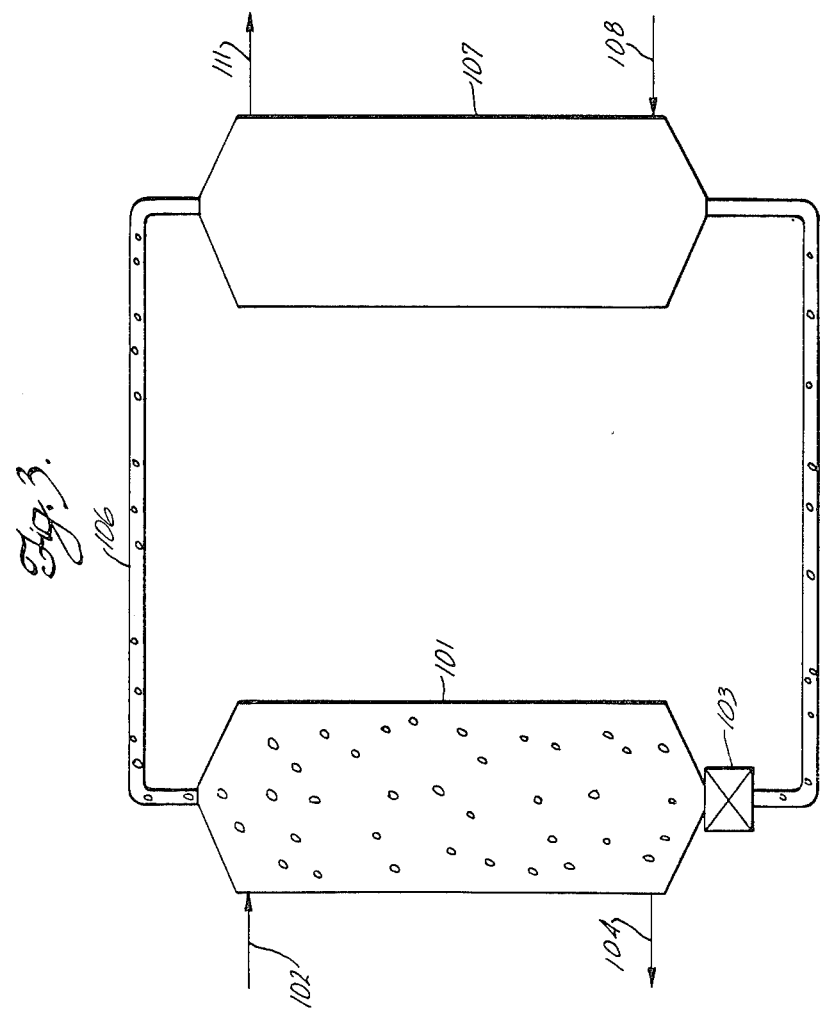
FIG. 3 is a schematic drawing showing an alternative condenser arrangement.

For example, condensers having solid particles or pellets in a fluidized state may be used, as well as solid particles in a static state. As illustrative, the process can comprise a moving solids condenser, such as that described in U.S. Pat. No. 3,843,462, which is incorporated herein by reference and shown schematically in FIG. 3.

In such a process, steam from the power turbine enters a first chamber 101 through line 102. The first chamber 101 contains solid particles at a first temperature below the condensation temperature of the steam. The solid particles are introduced to the bottom of the first chamber 101 by a pellet feeder 103 and move upwardly through the first chamber. Alternatively, the particles may be introduced at the top of the first chamber and flow downwardly.

The steam is introduced to the top of the first chamber and contacts the upwardly moving solid particles. Condensation occurs and the temperature of the solid particles increases. Condensed steam exits the bottom of the first chamber through line 104 and heated solid particles exit the top of the first chamber through line 106.

The heated solid particles are passed by line 106 to the top of second chamber 107. The solid particles move downwardly in the second chamber. Simultaneously, cooling fluid is introduced to the bottom of the second chamber 107 by line 108 and flows upwardly in the second chamber, contacting and cooling the downwardly flowing solid particles. The temperature of the cooling fluid is sufficiently below the first temperature to cool the solid particles to about the first temperature.

The solid particles exit the bottom of the second chamber 107 and are passed by line 109 to the first chamber to be introduced again to the bottom of the first chamber by pellet feeder 103. The cooling fluid, heated by contact with the solid particles, exits the top of the second chamber 107 through line 111. If water or another liquid is used as the cooling fluid, it can be cooled to its initial temperature in a cooling tower.

The present invention is equally applicable to a binary process. In such a process, heat from the geothermal brine, or other liquid heat source, is transferred to a secondary working fluid, usually a light hydrocarbon, e.g., isobutane, or a refrigerant. After heat has been transferred to the secondary working fluid, it is flashed and delivered to the power turbine as vapor. Although more complex than a direct flash process, the binary process has the advantage of delivering a much higher pressure vapor to the power turbine than does the direct flash process.

In addition to utilizing solid particles for condensing the exhaust vapor, such solid particles can be used to transfer heat from the brine to the secondary fluid. In such a process, as illustrated in FIG. 4, brine is introduced by line 120 to a first chamber 121 and heats solid particles contained in the first chamber. Simultaneously, a secondary working fluid is introduced by line 122 to a second chamber 123 containing solid particles previously heated by contact with the brine. Chambers 121 and 123 are drained through lines 126 and 127 respectively and the heated secondary working fluid is passed to a flash evaporating chamber 128. Brine is then passed to the second chamber 123 by line 129 to again heat the solid particles contained therein and secondary working fluid is introduced by line 131 to the first chamber 121 and is heated. Again chambers 121 and 123 are drained through lines 132 and 133 respectively and the working fluid is passed to the flash evaporating chamber 128. The cycle then repeats and provides means for continuously transferring heat from the brine to the secondary working fluid with minimal mixing of the fluids.

In a binary process, the power turbine exhaust comprises vapor of the secondary working fluid at a reduced pressure. Such exhaust vapor is continuously condensed in the same manner as the exhaust steam in the direct flash process described above. However, rather than injecting the condensed vapor into the ground, it is collected and recycled to the initial steps wherein heat is transferred from the hot brine to the secondary working fluid.

It is also apparent that this invention is applicable to heat engines other then power turbines and to processes other than those related to the production of power from low temperature heat sources.

With regard to processes using a heat engine for producing power, this invention provides the distinct advantage of increasing the efficiency of the power cycle of the heat engine. This is a result of the improved efficiency in heat rejection from the heat engine, resulting from the high heat transfer rates between the exhaust vapor and the solid particles. This assures rapid heat transfer over very small temperature differences.

Another significant advantage of the present invention is that metallic heat transfer surfaces of conventional condensers are eliminated. This results in significant plant cost reduction. The condensers of the present invention are also simpler and easier to use than conventional condensers and less susceptible to fouling and plugging. This results in lower operating costs.

EXAMPLE 1

The invention is illustrated by considering a direct flash process as illustrated in FIG. 1. In the process, brine enters the system and is passed to a flash evaporator at 250° F. Water in the brine is vaporized and forms steam at 200° F. which is fed to a power turbine. The remaining brine is rejected. Exhaust steam exits the turbine and is passed to either a first or a second condenser depending on which mode the process is in.

Each condenser comprises a chamber corresponding to a cube having a side length of 20 feet. Each chamber is packed with $1.1 \times 10^6$ pounds of alumina spheres, each sphere having a diameter of about 3/32 inch.

In the first mode, the exhaust steam is passed to the first condenser while cooling water is passed to the second condenser. At the beginning of the first mode, the alumina spheres of the first condenser are at 82° F. The pressure in the first condenser is adjusted so that the entering steam condenses at 102° F. After one minute, the temperature of the alumina spheres has increased to 100° F.

In the second condenser cooling water enters at 80° F. and contacts the alumina spheres which are initially at 100° F. After one minute, the temperature of the alumina spheres has been reduced to 82° F.

At the end of one minute the process is switched to the second mode wherein the exhaust steam is passed to the second condenser and cooling water is passed to the first condenser. After one minute, the temperature of the alumina spheres in the second condenser has increased to 100° F. and the temperature of the alumina spheres in the first condenser has been reduced to 82° F. The process is then switched back to the first mode and the cycle continuously repeats.

In this process, approximately $3.6 \times 10^6$ BTU is transferred in each chamber in the one minute interval. For calculating the behavior of the condenser a minimum temperature difference of 2° F. between condensing steam solid particles is provided. Estimated heat transfer coefficients associated with fluid/solid heat exchange are presented below in Table 1.

TABLE 1

| Hot Bed Power Heat Transfer Coefficients* | |
|---|---|
| Forced Convection | h (BTU/ft$^3$-hr-°F.) |
| Gases | $.92 \times 10^3 - 9.2 \times 10^3$ |

TABLE 1-continued

| Hot Bed Power Heat Transfer Coefficients* | |
|---|---|
| Water | $.42 \times 10^5 - 9.2 \times 10^5$ |
| Condensing Vapors | $.92 \times 10^5 - 9.2 \times 10^5$ |

*"Transport Phenomena," Bird, R.B., et al, p. 393, Wiley, New York (1962), based on specific area of 460 ft$^2$/ft$^3$ A rate of $5.35 \times 10^6$ pounds per hour of brine entering the system will thus produce 11.6 megawatts of power. This is a 16% improvement over a conventional process wherein 10 megawatts of power are produced in an otherwise similar direct flash process in which the exhaust steam at 115° F. is condensed by cooling water initially at 80° F. and which is allowed to heat to 100° F.

EXAMPLE 2

Another aspect of the invention is illustrated by considering a three-mode direct flash process as shown in FIG. 2 wherein staged condensers are used. As in Example 1, brine enters the process at 250° F., water in the brine is vaporized and passed as steam at 200° F. to the power turbine. Exhaust steam, at a reduced pressure exits the turbine.

In this process, the condenser arrangement consists of three condensers, each comprising a chamber packed with $5.5 \times 10^5$ pounds of alumina spheres, 3/32 inch in diameter.

At the beginning of the first mode, the alumina spheres in the first chamber are at 82° F., the alumina spheres in the second chamber are at 91° F., and those in the third chamber are at about 100° F. The pressure in the first chamber is adjusted so that the exhaust steam condenses at 93° F. and the pressure in the second chamber is adjusted so that the exhaust steam condenses at 102° F.

In the first mode, half of the exhaust steam is passed to the first chamber and the other half is passed to the second chamber. In each chamber, the exhaust steam contacts the alumina spheres, condensing the exhaust steam and heating the alumina spheres. After one minute, which is the duration of each mode, the temperature of the alumina spheres in the first chamber is 91° F. and the temperature of the alumina spheres in the second chamber is 100° F.

During the first mode, cooling water, initially at 80° F. is introduced to the third chamber and contacts and cools the alumina spheres in the third chamber to 82° F.

After one minute the process is switched to the second mode wherein half of the exhaust steam is passed to the first chamber and the other half to the third chamber. Cooling water is introduced to the second chamber. At the end of the one minute, the temperature of the alumina spheres in the first chamber has increased to 100° F., the temperature of the alumina spheres in the third chamber has increased to 91° F. and the alumina spheres in the second chamber have been cooled to 82° F.

The process is then switched to the third mode wherein half of the exhaust steam is passed to the second chamber and the other half to the third chamber. Cooling water is introduced to the first chamber. After one minute the alumina spheres in the second and third chambers are heated to 91° F. and 100° F. respectively while those in the first chamber are cooled to 82° F.

The process then is again switched to the first mode and the cycle repeats.

In this example a rate of $5.35 \times 10^6$ pounds per hour of brine entering the system will thus produce 12.2 megawatts of power. This is a 22% increase in power over the conventional process as described in Example 1.

The above-detailed description has been used only to illustrate the essential features inherent in the present invention. It is understood that the present invention is not restricted to the specific features mentioned, as other combinations and features utilizing the concepts of this invention will be obvious to those skilled in the art.

What is claimed is:

1. A process for removing heat from the exhaust of a heat engine comprising:
   (a) contacting exhaust vapor of a heat engine with solid particles at an initial temperature which is cooler than the temperature of the exhaust vapor for a time sufficient to cool the exhaust vapor and to heat the solid particles;
   (b) simultaneously cooling other solid particles to about the initial temperature; followed by
   (c) contacting exhaust vapor with solid particles previously cooled to about the initial temperature for a time sufficient to cool the exhaust vapor and to heat the solid particles;
   (d) simultaneously cooling solid particles, which were previously heated, to about the initial temperature; and then
   (e) continuously repeating steps (a) through (d).

2. A process as claimed in claim 1 wherein the exhaust vapor is condensed by contact with the solid particles.

3. A process as claimed in claim 1 wherein the solid particles are cooled by contact with a cooling fluid at a temperature below the initial temperature.

4. A process for condensing exhaust vapor from a heat engine comprising:
   (a) a first mode which comprises:
      (1) passing exhaust vapor to a first chamber containing solid particles at about a first temperature and contacting said particles for a time sufficient to condense the exhaust vapor and to increase the temperature of the particles to about a second temperature; and
      (2) simultaneously cooling solid particles contained in a second chamber from about the second temperature to about the first temperature; followed by
   (b) a second mode which comprises:
      (1) passing exhaust vapor to the second chamber for a time sufficient to condense the exhaust vapor and to increase the temperature of the solid particles from about the first temperature to about the second temperature; and
      (2) simultaneously cooling the solid particles contained in the first chamber from about the second temperature to about the first temperature; and then
   (c) continuously repeating steps (a) and (b) during the operation of the heat engine.

5. A process as claimed in claim 4 wherein the second temperature is below the condensation temperature of the exhaust vapor.

6. A process as claimed in claim 4 wherein the solid particles are cooled by contact with a cooling fluid having a temperature below the first temperature.

7. A process as claimed in claim 6 wherein the cooling fluid is air.

8. A process as claimed in claim 6 wherein the cooling fluid is water.

9. A process as claimed in claim 4 wherein the solid particles comprise a material of varying conductivity selected from the group consisting of alumina, iron, stainless steel, aluminum, silica, sand, gravel and mixtures thereof.

10. A process for condensing exhaust vapor from a heat engine comprising:
    (a) a first mode which comprises:
       (1) passing exhaust vapor to a first chamber containing solid particles at about a first temperature and contacting said particles for a time sufficient to condense the exhaust vapor and to increase the temperature of the particles to about a second temperature below the condensation temperature of the exhaust vapor; and
       (2) simultaneously cooling solid particles contained in a second chamber from about the second temperature to about the first temperature by contacting the solid particles with a cooling fluid having a temperature below the first temperature; followed by
    (b) a second mode which comprises:
       (1) passing the exhaust vapor to the second chamber and contacting the particles in the second chamber for a time sufficient to condense the exhaust vapor and to increase the temperature of the solid particles from about the first temperature to about the second temperature; and
       (2) simultaneously cooling the solid particles contained in the first chamber from about the second temperature to about the first temperature by contacting the solid particles with a cooling fluid having a temperature below the first temperature; and then
    (c) continuously repeating steps (a) and (b) during the operation of the heat engine.

11. A process as claimed in claim 10 wherein the cooling fluid is air.

12. A process as claimed in claim 10 wherein the cooling fluid is water.

13. A process as claimed in claim 10 wherein the solid particles are made of a material selected from the group consisting of alumina, iron, stainless steel, aluminum, silica, sand, gravel and mixtures thereof.

14. A process for condensing exhaust vapor from a heat engine comprising a first chamber and a second chamber wherein:
    (a) exhaust vapor is continuously introduced to a first chamber;
    (b) solid particles at about a first temperature below the condensation temperature of the exhaust vapor are continuously passed from the second chamber to the first chamber wherein the solid particles contact the exhaust vapor in the first chamber which condenses the exhaust vapor and heats the solid particles to about a second temperature;
    (c) condensed vapor is continuously removed from the first chamber;
    (d) cooling fluid at a temperature below the first temperature is continuously introduced to the second chamber;
    (e) solid particles at about the second temperature are continuously passed from the first chamber to the second chamber wherein the solid particles contact the cooling fluid, thereby cooling the solid particles to about the first temperature and heating the cooling fluid; and (f) heated cooling fluid is continuously removed from the second chamber.

15. A process as claimed in claim 14 wherein the cooling fluid is air.

16. A process as claimed in claim 14 wherein the cooling fluid is water.

17. A process as claimed in claim 14 wherein the solid particles are made of a material selected from the group consisting of alumina, iron, stainless steel, aluminum, silica, sand, gravel and mixtures thereof.

18. A process as claimed in claim 14 wherein the second temperature is below the condensation temperature of the exhaust vapor.

19. A process for condensing vapor in a first exhaust stream and in a second exhaust stream from a heat engine comprising:

(a) a first mode comprising:
  (1) passing the first exhaust stream to a first chamber containing solid particles at about a first temperature and contacting said particles at about a first pressure sufficient to condense vapor in the first exhaust stream and to increase the temperature of the particles to about a second temperature;
  (2) simultaneously passing the second exhaust stream to a second chamber containing solid particles at about a second temperature and contacting said pellets at about a second pressure sufficient to condense vapor in the second exhaust stream and to increase the temperature of the particles to about a third temperature; and
  (3) simultaneously cooling solid particles in a third chamber from about the third temperature to about the first temperature; followed by (b) a second mode comprising:

(1) passing the first exhaust stream to the third chamber and contacting the particles in the third chamber at about the first pressure for a time sufficient to condense steam in the first exhaust stream and to increase the temperature of the solid particles to about the second temperature;
  (2) simultaneously passing the second exhaust stream to the first chamber and contacting the solid particles in the first chamber at about the second pressure to condense steam in the high pressure exhaust stream and to increase the temperature of the solid particles to about the third temperature; and
  (3) simultaneously cooling solid particles in the second chamber from about the third temperature to about the first temperature; followed by (c) a third mode comprising:
  (1) passing the first exhaust stream to the second chamber and contacting the particles in the second chamber at about the first pressure for a time sufficient to condense steam in the first exhaust stream and to increase the temperature of the solid particles to about the second temperature;
  (2) simultaneously passing the second exhaust stream to the third chamber and contacting the solid particles in the third chamber at about the second pressure to condense steam in the high pressure exhaust stream and to increase the temperature of the solid particles to about the third temperature; and
  (3) simultaneously cooling solid particles in the first chamber from about the third temperature to about the first temperature; followed by (d) continuously repeating steps (a), (b) and (c).

20. A process as claimed in claim 19 wherein the first and second exhaust streams are discharged from the heat engine at different pressures.

* * * * *